March 17, 1942.  J. W. HUFFMAN  2,276,977
ABSORPTION REFRIGERATION SYSTEM
Filed Sept. 19, 1939
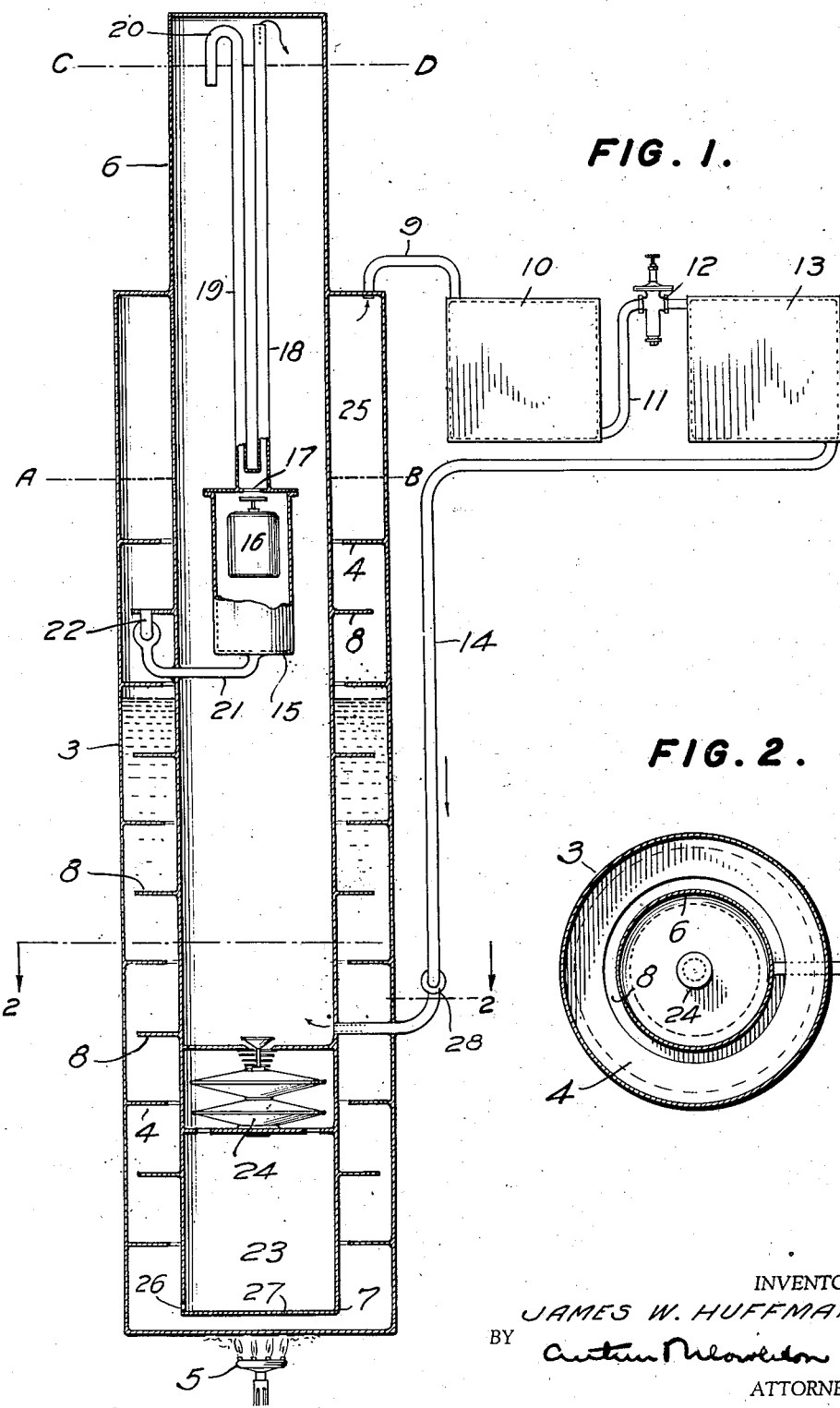
INVENTOR.
JAMES W. HUFFMAN,
BY
ATTORNEY.

Patented Mar. 17, 1942

2,276,977

UNITED STATES PATENT OFFICE 2,276,977

ABSORPTION REFRIGERATION SYSTEM

James W. Huffman, Forth Worth, Tex.

Application September 19, 1939, Serial No. 295,557

14 Claims. (Cl. 62—5)

This invention relates to refrigeration and, more particularly, to refrigeration systems of the absorption type and has particular reference to ammonia absorption systems.

In refrigerating systems of the absorption type it is common to have a generator in the form of a reservoir containing a solution of a refrigerant, the generator being heated by appropriate means to cause a circulation of the refrigerant through an appropriate refrigerating element from which it is returned to a separate absorbing reservoir wherein the refrigerant is reabsorbed in the mother liquor or liquid menstruum.

The present invention affords an improved arrangement of the several elements of such a system and has for a prime object a more complete utilization of heat evolved exothermically in the reabsorption of the refrigerating medium by arranging the generator and the absorber in close heat exchange relationship.

A further object is to provide for more efficient and more economic operation of the system by providing automatically for substantially uniform operation regardless of outside temperatures.

A further object is to provide a refrigerating system which is quite compact, therefore requiring a minimum of space for its accommodation.

With these and other objects in view, the invention consists in the construction and novel combination and arrangement of parts hereinafter fully described, illustrated in the accompanying drawing, and set forth in the claims hereto appended, it being understood that various changes in the form, proportion and minor details of construction, within the scope of the claims, may be resorted to without departing from the spirit of the invention or sacrificing any of the advantages thereof.

In the drawing,

Fig. 1 is a vertical sectional view, more or less diagrammatical, through an absorption refrigerating system embodying features of the present invention.

Fig. 2 is a horizontal section taken substantially on the line 2—2 of Fig. 1.

In the present embodiment of the invention there is provided a chamber 3 which constitutes a generator or still and which is annular in form. This generator is closed at the top and bottom as readily seen and is preferably provided internally with annular flanges 4 for requiring liquids and gases within the chamber to follow a circuitous path and to discourage mixing of various strata having different degrees of concentration. The generator 3 is adapted to be heated from beneath its bottom by an appropriate heating element such as the gas burner 5 to cause a volatilization and circulation of the refrigerant in a manner well known in the art.

Located concentrically of the generator 3 is a second chamber 6 constituting the absorber of the present invention. It will be seen that the walls of the absorber 6 define the inner annulus of the annular generator and that the absorber is closed at its top, and is also closed at its lower end 7 by means of a cover plate 27. The walls of the absorber 6, on their outer sides, are preferably equipped with annular flanges 8 which cooperate with the flanges 4 and serve as baffles for causing liquid and gases in the generator to follow a circuitous path and assist in preventing the mingling of strata. A connection 9 is shown leading from the top part of the generator 3 which communicates with a condenser 10 whereby, in the present embodiment, ammonia gas distilled from the liquid in the generator is conducted therefrom to the condenser and condensed into liquid phase. The condenser 10 communicates through pipe 11 and expansion valve 12 with an evaporator or refrigerating coil 13 which in turn has outlet piping 14 to conduct the spent refrigerant into the absorber 6 as readily seen in the drawing. A check valve 28 is preferably provided in the line 14 to prevent liquid from the absorber 6 from backing up into the evaporator.

Located within the absorber 6 is a float valve chamber 15 provided with a float valve 16 for opening and closing the port 17 in the float valve chamber through which the said chamber communicates with a vertical vent pipe 18 and a siphon supply pipe 19 provided with a substantially U-shaped upper end as indicated at 20. A conduit 21 leads from the bottom of the float chamber 15 and terminates in a non-return check valve 22 within the annular generator 3, substantially below the normal liquid level therein.

The lower part of the internal chamber 6 is in communication with the generator 3 by means of the port or ports 26 which open through the side wall of the chamber 6 and permit liquid from generator 3 to flow into the reservoir or trap 23. The flow of liquid from the trap 23 into the absorber 6 proper is regulated and controlled by a bellows valve 24 which is responsive to changes in concentration of the liquid within the generator 3 at about the same level as the bellows.

In the general operation of the device it is understood that the system is filled with an appropriate amount of water and ammonia gas. Under normal circumstances the generator will contain a solution of ammonia, the normal liquid level being substantially indicated at the line A—B. With the burner 5 in operation the ammonia gas will be more or less constantly boiled off from the liquid and the concentration of ammonia will be greatest at the liquid level A—B, and will progressively decrease toward the bottom of the generator 3. The space in the generator above the liquid level A—B, designated by the numeral 25, serves as a rectifier wherein the gas being driven off from the solution is cooled down to within a few degrees of the temperature in the condenser 10 thereby losing practically all of its moisture content so that a substantially dry gas is delivered to the condenser 10 through the connection 9. The gas is condensed in the condenser and passes through the expansion valve into the evaporator 13 where it produces the desired refrigeration, all in well known manner. The spent gas leaves the condenser 13 and is conducted through the piping 14 into the absorber 6, thus completing the cycle of gas circulation.

As the reaction of the absorbing of ammonia gas in water liberates considerable heat, the heat evolved by the absorbing of the returned gas in the absorber 6 is conveniently utilized to assist in the heating of the solution in the generator to provide a highly efficient utilization of the heat, in boiling off ammonia gas from the contents of the generator. The said heat evolved, in combination with the heat of the contents of the generator 3 is also utilized in effecting an automatic and regulated transfer of strong liquor from the absorber into the generator, thus initiating the flow of the liquid phase.

The liquid level in the absorber 6 normally lies approximately at the line C—D, which level is always maintained somewhat above the intake end of the hooked portion 20 of the pipe 19. With the liquid level in the absorber 6 at approximately the line C—D and the float valve 16 in a lower open position as shown, relatively strong liquor from the upper portion of the absorber will siphon through the pipe 19 into the float chamber 15 until it has filled sufficiently to cause the float valve 16 to rise and close the opening 17, any gas trapped within the float chamber being vented through the pipe 18. Now, with the valve 16 closed, the strong liquor within the float chamber 15 will be heated by the combination of the heat evolved in the absorber 6 and the heat of the liquid within the annular generator 3 thus increasing the pressure within the float chamber. When this pressure has increased sufficiently so that it rises substantially above the pressure within the contents of the generator at the point where the discharge section 22 terminates, then strong liquor will discharge from the float chamber 15 into the generator 3 until the pressure within the float chamber has decreased to a point below that in the generator.

With the burner 5 in operation and ammonia gas being more or less constantly volatilized from the solution in the generator 3, the solution therein will naturally be strongest at the liquid level and progressively decreasing in ammonia concentration toward the bottom of the generator so that the liquid adjacent the bottom and flowing into the trap 23 will have the lowest concentration. The opening of the bellows 24 depends upon the concentration of liquor in the outside generator 3 in the locality or the same level as the bellows. Because the liquor in the generator 3 and absorber 6 move very slowly the temperature in the outside generator is at all times approximately the same as the temperature in the inside absorber at the same levels. The fast heat exchange between walls makes this so. So now if the bellows 24 is filled with a 10% ammonia solution when the concentration of the descending liquor in the generator at the level of the bellows is reduced by boiling off ammonia to 10%, then the pressure inside the bellows will be the same as the pressure in the generator. Then any subsequent lowering of concentration in the generator 3 would accompanying a rising of temperature at that level and the pressure in the bellows would open the valve. Now as the liquor in the generator 3 progresses downward from the region of 10% concentration adjacent to the bellows the concentration is reduced more and more as the temperature is raised so that if the part of the generator below the vicinity of the bellows were extended far enough all the ammonia would boil out and leave water in the bottom of the generator. Then as this water started back up toward the absorber, its temperature would be lowered until it reached the bellows and it would arrive at and surround the bellows with zero concentration and the same temperature as the 10% liquor in the generator at the same level. So it is seen that the concentration of the outgoing liquor not only depends upon the concentration in the bellows but the length of the extension of the generator below the bellows. Now the bellows might be placed in the bottom of the generator and then the concentration of the outgoing liquor would be the same as the concentration in the bellows.

Thus so long as the strength of the liquor in the generator at the level of the bellows 24 is greater than the strength of the liquor within the bellows, the concentration responsive valve will remain closed and prevent the ingress of liquor into the absorber 6. However, when the strength of the liquor in the generator 3 at the level of the bellows drops below the strength of the liquor within the bellows, then the valve 24 will open, permitting the weak liquor to flow into the absorber 6 and thus raise the liquid level C—D and the pressure within the absorber, which will eventually cause a siphoning of strong liquor from the absorber to the float chamber 15, as previously described. The pressure rises in the absorber 6 when the absorber fills, because the liquid from the much higher pressure generator flows into the absorber causing a hydraulic pressure which opens the float valve.

The hydraulic, or liquid pressure, in the absorber when the absorber is full is caused by entrance of more weak liquor being forced into the absorber from the high pressure generated through the bellows valve or concentration-stat valve 24. This additional pressure in the absorber being hydraulic rather than pneumatic, is immediately released when the liquid starts flowing into the float valve chamber 15. When the float valve opens and liquid flows from absorber 6 into the float chamber 15, the pressure in the absorber returns to the normal absorber pressure.

The operation of the absorption system of the present invention, as well as the general arrangement of elements, provides a number of improved effects not experienced in any previous arrangement. These effects will be brought out in the following detailed description of the manner in which the invention achieves some of its objects. This refrigeration process will, preferably, use ammonia and water, but not necessarily so. However, for the purposes of convenience, it will be discussed as an ammonia absorption system.

The straight pipe 18 will carry ammonia gas upwardly from the float valve chamber 15 to the top of the absorber, while at the same time liquor is flowing downward through the bent pipe 19 into the float valve chamber. The crooked pipe acts as a siphon so that when the liquor has begun to run downward through the crooked pipe it will siphon into the float chamber till the chamber is about full. When the float chamber is about full the float 16 rises and closes the valve 17.

Now, with the valve closed the liquor is heated, by the surrounding liquor in the still 3 and absorber 6 until the pressure within the float valve chamber is somewhat higher than the pressure in the still, at which time the liquor will flow from the float chamber through pipe 21 to the still. While the liquor is flowing from the float chamber to the still, the float valve is held shut by the pressure within the chamber. When the absorber again fills up and builds up some pressure the float valve will again open as before.

The pressure that is required in the absorber 6 to operate the float valve is just enough so that with the downward pull of the float 16 on the valve the two combined forces will open the float valve. From this it follows that it is not the pressure from the absorber alone that opens the valve but that the weight of the float is also trying to open it. The float valve must be light enough so that its own weight will not open the valve, because it would then be opened before the full charge had been delivered to the still. For these reasons, therefore, the pressure in the absorber 6 would not rise as high as the pressure in the still 3. The pressure in the float valve chamber would rise slightly higher than the pressure in the still, but the pressure in the absorber would not.

The temperature of the top part of the absorber 6 is always somewhat higher than room temperature, or, in effect, higher than the temperature of the air surrounding the absorber, since both the absorber and condenser 10 are cooled by air. It is to be understood that only a small part of the absorber heat is removed by air as the greater part of the heat liberated in the absorber by the absorbing ammonia gas has been transferred to the generator 3. Also, part of the absorber heat is used to bring the charge in the float chamber up to the temperature and pressure required to expel the charge into the still from the float chamber.

The temperature at the bottom of the still 3 is relatively much higher than the temperature at the top part of the absorber 6. The temperature at the bottom of the still is not constant but varies from time to time as the weather temperatures change. The temperature in the bottom of the still will ordinarily vary from about 300° F. to about 350° F. Likewise, the temperature at any given place between the top and the bottom will have a relative variance.

The position of the float valve chamber 15 is about even with the liquid level in the still or somewhat lower. It will have to be a little lower because the heat required to raise the temperature and pressure of the charge of strong liquor in the float chamber comes from the still and absorber. When the temperature in the float chamber is raised as high as the temperature in the still at the liquid level, the pressure in the float chamber is just equal to the pressure in the still because the ammonia concentrations in the two chambers are equalized at this level. Now, if the float chamber extends somewhat lower than the liquid level the temperature in the float chamber will tend to rise to the temperature the same distance below the liquid level in the still as the float chamber or to a higher temperature than at the liquid level. This higher temperature in the float chamber causes the corresponding higher pressure to force the charge from the float chamber to the still.

The float valve chamber might, for accessibility, be placed outside of the absorber and still, but would have to be in close heat exchange relationship with them unless the float chamber were heated by its own individual source of heat.

The "concentrationstat" 24 may also be placed outside of the absorber and still if desired, and in this case there would be a bulb inside the still communicating with the bellows of the concentrationstat much the same as is used on many thermostats where the controlling bellows is remote from the bulb. In this case there would be a pipe leading from the still chamber to the concentrationstat valve and from the valve to the bottom of the absorber.

In this concentric arrangement of the still and absorber, either the still or the absorber may be placed outside.

A thermostat could be used intsead of a concentrationstat if the pressure in the still were always held constant; but this arrangement would not be nearly as efficient. To show the undesirability of a constant pressure, we will take an example: Suppose that on a very hot summer day the temperature of the condensing air were 105° F.; that is, if the weather temperature is 105° F., then the pressure in the still and absorber corresponding to this temperature, would be 214 pounds gauge (229 pounds absolute) according to accepted ammonia tables. The pressure would actually have to be about 30 or 40 pounds higher than this to make the condensing coils 9 or 10 degrees higher than the surrounding air to accomplish fast heat exchange. From this, the actual pressure would be around 250 pounds gauge. During the night, or on another day, the temperature, instead of being 105 degrees, might be 80 degrees. In this case 180 or 190 pounds gauge pressure would operate the refrigeration much more efficiently, for the reason that the temperature in the still would be much lower at 180 pounds than at the 250 pounds. It follows that carrying extraordinary high pressure at times would result in a considerable lesser efficiency.

In case of the use of a thermostat: If the pressure were not held constant the concentration of the outgoing liquor would have to fluctuate and this would be still less efficient than in the case of constant pressure. To use an example of a thermostatically operated still with varying pressure, suppose the weather is 70 degrees: Refrigeration apparatus to operate at this temperature would require a still pressure of about 135 pounds gauge. For this condition the concentration of the outlet liquor should be around 10% ammonia, and at this concentration the temperature of the outlet liquor would be about 307°.

Now, on the above supposed day of 105° temperature, when the pressure is 250, the thermostat would let the liquor out, not at 10%, but 307 degrees with a resulting concentration of 20%.

Such a high outlet concentration would lower efficiency. It is seen, then, that the liquor should be let out at a constant concentration rather than at a constant pressure or temperature.

This process is unique, in that it evaporates the maximum amount of ammonia from the liquor before returning it to the absorber from the still. It is also new in the method of exchanging the maximum amounts of heat from the hot, weak liquor to the still and from the absorber to the still. It is readily seen that this heat exchange is the maximum because the solutions are always in heat exchange relationship. It is also apparent that while the liquor is traveling downwardly, either in the still or in the float chamber, it is being heated by the rising liquor in the absorber. When the liquor has reached the lower extremity of its downward travel in the generator it starts back up, and does not enter the low pressure absorber immediately but only after it has exchanged considerable of its heat back to the still as explained in a previous discussion.

Another novelty in it is the "concentration-static" control of the outlet liquor. By lengthening the lower end of the still past the control bellows, the concentration could, if desired, be brought to practically zero.

The bottom part of the still is filled with water or liquor from which the ammonia has been driven off, and this water forms steam which rises up through the still evaporating ammonia as the steam is condensed. Some authorities state that it is not best to heat ammonia by a direct flame but that steam is the ideal heat source. If steam in coils were to be used here, as in the usual manner, it would supply heat at a constant temperature but in this still a gradation of temperature from bottom to top is essential. Also, steam heats most efficiently when in direct contact with a liquid as is the case here. As the steam rises up to successively cooler portions of the still, the steam pressure is reduced and the corresponding temperature is also reduced. In other words, as the steam rises it begins to drive off ammonia vapor and there is a partial pressure of steam and a partial pressure of ammonia gas. When the steam and ammonia gas have reached the outlet of the still, practically all the steam has been condensed and almost pure ammonia gas escapes to the condenser.

If the steam were condensed at a constant steam pressure in the still, then the condensing temperature would always be the same; but since the partial pressure of the steam is successively reduced as the steam rises in the still, its temperature is correspondingly reduced.

This feature of using the partial pressure of steam over the widest range of temperature is novel. It is not meant here that the steam does all the heating but only a part of the total heat is produced by the steam and direct heat source or flame. In order to use steam at various temperatures, it would have to be generated separately at different pressures or subject to control by many clumsy regulators.

The annular baffles 4 and 8 perform an important function by insuring that a substantial amount of steam is generated by the heat of the burner 5 acting upon the water or very weak liquor in the lowermost portion of the generator 3. This fact will be appreciated from a consideration of the well known fact that, upon heating an unrestricted body of water, heated water rises away from the source of heat and cooler water flows in to take its place with the result that little or no steam is evolved until the entire mass of water reaches the boiling temperature. On the other hand, if the water is confined and prevented from circulating to any considerable extent the heat concentrated upon a quantity of confined water will soon cause the formation of steam in that water. Thus the baffles serve to confine and restrict the water or liquor so that steam is produced readily and rapidly in the water near the bottom of the generator. As the steam rises its progress is regulated or impeded by the baffles and it thus proceeds deflectedly on its upward course during which it encounters gradually lowering pressures and temperatures. As it gives out its heat to such environment and finally condenses, it gives off its specific heat as well. This heat, thus, is of considerable assistance, for when released to the surrounding liquor it tends toward the evaporating and driving off or gasifying of the ammonia as gas.

One of the novel features in this system that differs fundamentally from the prior art is that the absorber 6 is concentric with the generator 3. In the drawing, the absorber is inside the generator for most of its length. It could be outside and the generator inside.

Now in this arrangement the absorbing substance, which is here considered as ammonia, gives off heat in absorbing in water. In absorbing, the ammonia gives off almost exactly the same amount of heat that it takes up in boiling out of the water. So when one pound of ammonia absorbs in the absorber, it will give off just enough heat to drive off one pound of ammonia from the liquid in the generator. It is not to be supposed, however, that this always necessarily holds true in actual practice, because for specific reasons to be named, it does not work that way. Because the pressure in the generator 3 is higher than the pressure in the absorber 6, it takes a higher temperature to drive off ammonia at a concentration of, say 20% ammonia, than would be produced in the absorber by a 20% ammonia solution absorbing ammonia gas This may not be clear at first, and it seems that the principle has been usually overlooked or not understood by others in the art. To make this clear, the following example is given: Suppose that in the top of the generator where the liquid is richest in ammonia, that the percentage is 50% ammonia and the pressure is 180 pounds per square inch; then according to the table on properties of aqua ammonia, the temperature of boiling will be 158.7 degrees Fahrenheit (158.7° F.), and suppose the pressure in the absorber is 55 pounds per square inch, the temperature will be the same as before so the solution would absorb ammonia until the concentration reached approximately 29% ammonia. These conditions are selected because they are about what would normally exist in summer time.

The ammonia liquor is supposed to leave the generator when the concentration is about 10% or lower. When the weak—say 9% liquor leaves the bottom of the generator and enters the absorber starting toward the top of the absorber, it is too hot to absorb ammonia, so for this reason it is not let into the absorber until it has progressed up a way under pressure in the inner pipe in the zone 23. Now with the former pressure of 180 pounds per square inch, when the concentration has dropped to 9% in the bottom of the generator or still, the temperature is found to be 328° F. But because the temperature has to be reduced to 238° F. before it will begin to absorb the gas, it is led up into the portion 23 which extends about one-third of the way to the top of the liquor in the still to where the temperature is 238° F. and let out into the absorber through valve 24. Now its temperature is 238° F., its pressure 55 lbs., its concentration 9% ammonia. As it rises in the absorber it will absorb (NH₃) ammonia gas and as it absorbs gas it gives off heat which heats the still and drives off gas in the still 3 until the concentration in the absorber is 29% ammonia and the temperature is about 159° F. From this point on to the top of the absorber, the absorber heat does not generate any gas, but on giving off its heat it heats up the liquor, returning to the still as a counter flow heat exchange process.

The strongest liquor coming into the still is taken as 50% and the weakest liquor leaving still is 9%—a difference of 41%. This 41% is the change in concentration. This difference is not constant and will vary according to the weather temperature. The still pressure and the condenser pressure are the same and will be higher in hot weather, and lower in cool weather. Now of this 41% ammonia which actually does the refrigeration, 20% has been generated by the absorbing ammonia and 21% by other primary source. This is a source of heat that has not been utilized by any of the other prior art.

It is known to use the heat in the hot liquor from the still to partly heat the liquor coming into the still, but because there is less liquor leaving the still than returning, it does not heat as much as would be the case where all the liquor, and gas as well, heated the incoming liquor. The present process utilizes all the heat that prior practice does, plus the heat from the absorber. Also as the liquor is never led away from the generator through a long heat wasting set of pipes, there is not as much loss of heat.

The prior practice does not utilize the concentration regulator 24 as the present invention does, as will be explained. On the face of the matter, it seems that some of the thermostatically operated bellows type valves are the same as the valve 24 and to look at, they appear so; that upon closer investigation, they are not. They are all thermostatic—meaning that they operate at a given constant temperature. The valve 24 to let out the weak liquor is specifically a "concentrationstat," meaning that it lets out the liquor at a given constant concentration of ammonia. If the pressure in the still and condenser were always the same, the valve 24 would be the same as a thermostat, but because a more flexible operation, such as a condenser pressure fluctuating with weather temperature, a much more economical operation is secured by a "concentrationstat." The system always operates more efficiently on a small condenser pressure because the temperature in the still is much lower than would be at a higher condenser and still pressure.

Suppose the air temperature is 100° F., then the temperature inside the condenser will be about 105° F., the condensing pressure will be 229 lbs. Suppose the "concentrationstat" 24 is set to let the liquor out at 9% ammonia; then the next day when the temperature is 75° F. the condenser temperature will be about 80° F., the pressure 153 lbs. In the above case the liquor goes out at 9% and about 346° F. Now in the last case, if the valve 24 were a thermostat, the liquor would not leave the still until the temperature reached 346°, which would require a concentration of 4%. Now suppose at night the condenser temperature dropped to 60° F., the concentration would drop to 0, or all of the ammonia would boil out of the water and the temperature of the boiling water would still be below 346° F., and the thermostat would not open. Then the refrigerator would stop. But with the "concentrationstat" 24, the concentration—not the temperature—will remain constant and the machine will keep operating.

1. In an ammonia absorption refrigerating system, a generator, an absorber extending downwardly in said generator, a concentration responsive valve in said absorber adjacent its lower end and adapted to permit liquor of a predetermined concentration to flow thereinto from the lower part of said generator, means for heating the contents of said generator, a float chamber within said absorber, a float valve in said chamber, means for permitting liquor from the upper part of said absorber to flow into said chamber when said float valve is open, a conduit from said chamber to said generator whereby liquor is expelled from said chamber into said generator in response to increases of pressure within said chamber, means leading from the upper part of said generator for conducting ammonia gas to a point of use for refrigeration purposes, and means for returning spent ammonia gas into the lower part of said absorber.

2. In an absorption refrigerating system, a generator holding a solution of absorption liquid and refrigerant, and effective to vaporize the refrigerant from the solution, an absorber holding a solution of absorption liquid and newly absorbed refrigerant therein, said absorber arranged concentrically with said generator and extending downwardly therethrough, said arrangement effective to realize a direct heat transfer from the solution in the absorber to the solution in the generator by way of the wall dividing said solutions, a concentration responsive valve in said absorber at its lower end and adapted to permit liquor of a predetermined concentration to flow thereinto from the lower part of said generator, means for heating the contents of said generator, means for transferring strong liquor from said absorber to said generator, means leading from the upper part of said generator for conducting vaporized refrigerant to a point of use for refrigeration purposes, and means for returning spent refrigerant into the lower portion of said absorber.

3. In an absorption refrigerating system, a generator holding a solution of absorption liquid and refrigerant, and effective to vaporize the refrigerant from the solution, an absorber holding a solution of absorption liquid and newly absorbed refrigerant therein, said absorber arranged concentrically with said generator and extending downwardly therethrough, said arrangement effective to realize a direct heat transfer from the solution in the absorber to the solution in the generator by way of the wall dividing said solutions, means for transferring weak liquor from said generator to said absorber, means for heating the contents of said generator, a float chamber within said absorber, a float valve in said chamber, means for permitting liquor from the upper part of said absorber to flow into said chamber when said float valve is open, a conduit from said chamber to said generator whereby liquor is expelled from said chamber into said generator in response to increase of pressure within said chamber, means leading from the upper part of said generator for conducting vaporized refrigerant to point of use for refrigeration purposes, and means for returning spent refrigerant into the lower part of said absorber.

4. In an absorption refrigerating system, a generator holding a solution of absorption liquid and refrigerant, and effective to vaporize the refrigerant from the solution, an absorber holding a solution of absorption liquid and absorbed refrigerant therein, means for transferring strong liquor from said absorber to said generator responsive to increase in pressure in said absorber, and comprising a float chamber adapted to be heated, a float valve in said float chamber, means for permitting liquor from the upper part of said absorber to flow into said chamber when said float valve is open, a conduit from said chamber to said generator whereby liquor is expelled from said chamber into said generator in response to increase of pressure within said chamber due to the heating thereof, means for transferring weak liquor from said generator to said absorber, means for conducting refrigerant from said generator to a point of use for refrigeration purposes, and means for returning spent refrigerant to said chamber.

5. In an absorption refrigerating system, a generator holding a solution of absorption liquid and refrigerant, and effective to vaporize the refrigerant, absorber holding a solution of absorption liquid and absorbed refrigerant therein, said generator and said absorber being arranged in close heat exchange relationship whereby both solutions are separated by a wall through which heat transfer takes place between the solutions, means for transferring strong liquor from said absorber to said generator, means for transferring weak liquor from said generator to said absorber, comprising a concentration responsive valve in said absorber at the lower end thereof and spaced upwardly an appreciable distance from the bottom level of the generator, a wall portion extending downwardly from said concentration responsive valve, and disposed to cause liquor in the generator to descend down along said wall portion to a point substantially below said valve, and then to ascend within said wall structure to said valve, means for conducting refrigerant from said generator to a point of use for refrigeration purposes, and means for returning spent refrigerant to said absorber.

6. In an absorption refrigerating system, a generator for holding a solution of absorption liquid and refrigerant and effective to vaporize the refrigerant from the solution, an absorber for holding a solution of absorption liquid and newly absorbed refrigerant therein, said absorber being in close heat exchange relationship with said generator whereby there is realized a direct heat transfer between the solution in the absorber and the solution in the generator by a wall dividing said solutions, means for transferring strong liquor from said absorber to said geenrator, means for transferring weak liquor from said generator to said absorber, means for conducting refrigerant from said generator to a point of use for refrigeration purposes, and means for returning spent refrigerant to said absorber.

7. In an absorption refrigerating system, a generator for holding a solution of absorption liquid and refrigerant and effective to vaporize refrigerant from the solution, an absorber for holding a solution of absorption liquid and newly absorbed refrigerant therein, said generator and said absorber arranged in concentric relationship and extending one within the other whereby there is realized a direct heat transfer between the solution in the absorber and the solution in the generator by a wall dividing said solutions, means for transferring strong liquor from said absorber to said generator, means for transferring weak liquor from said generator to said absorber, means for conducting refrigerant from said generator to a point of use for refrigeration purposes, and means for returning spent refrigerant to said absorber.

8. In an absorption refrigerating system, a generator for holding a solution of absorption liquid and refrigerant and effective to vaporize the refrigerant from the solution, an absorber for holding a solution of absorption liquid and newly absorbed refrigerant therein, said absorber being surrounded by said generator whereby there is realized a direct heat transfer between the solution in the absorber and the solution in the generator by a wall dividing said solutions, means for transferring strong liquor from said absorber to said generator, means for transferring weak liquor from said generator to said absorber, means for conducting refrigerant from said generator to a point of use for refrigeration purposes, and means for returning spent refrigerant to said absorber.

9. In an absorption refrigerating system, a generator for holding a solution of absorption liquid and refrigerant and effective to vaporize the refrigerant from the solution, an absorber for holding a solution of absorption liquid and newly absorbed refrigerant therein, said generator and said absorber being arranged so that one is surrounded by the other, whereby there is realized a direct heat transfer from the solution in the absorber to the solution in the generator by a wall dividing said solutions, means for transferring strong liquor from said absorber to said generator responsive to increases in pressure in said absorber comprising a float chamber adapted to be heated, a float valve in said float chamber, means for permitting liquor from the upper part of said absorber to flow into said chamber, when said float valve is open, and a conduit from said chamber to said generator whereby liquor is expelled from said chamber into said generator in response to increase of pressure within said chamber due to the heating thereof, means for transferring weak liquor from said generator to said absorber responsive to the concentration of the liquor, means for conducting refrigerant from said generator to a point of use for refrigeration purposes, and means for returning spent refrigerant to said absorber.

10. In an absorption refrigerating system, a generator for holding a solution of absorption liquid and refrigerant and effective to vaporize refrigerant, an absorber for holding a solution of absorption liquid and newly absorbed refrigerant therein, said generator and said absorber being arranged so that one is surrounded by the other whereby there is realized a direct heat transfer between the solution in the absorber and the solution in the generator through a wall dividing said solutions, means for transferring strong liquor from said absorber to said generator comprising a concentration responsive valve in said absorber at the lower end thereof and spaced at an appreciable distance upwardly from the bottom of the generator, a downwardly extending wall structure surrounding said concentration responsive valve disposed to cause liquor in the generator to descend at the outside of said wall structure to a point substantially below said valve and then to ascend within said wall structure to said valve, means for transferring weak liquor from said generator to said absorber responsive to the concentration of the liquor, means for conducting refrigerant from said generator to a point of use for refrigeration purposes, and means for returning spent refrigerant to said absorber.

11. In an absorption refrigerating system, a generator for holding a solution of absorption liquid and refrigerant and effective to vaporize the refrigerant from the solution, an absorber for holding a solution of absorption liquid and newly absorbed refrigerant therein, said generator and said absorber arranged so that one is surrounded by the other, whereby there is realized a direct heat transfer between the solution in the absorber and the solution in the generator by a wall dividing said solutions, a heating element for applying heat to the lower portion of said generator, and means in said generator for restricting circulation of liquid therein so as to cause the formation of steam in the liquid when heated by said heating element.

12. In an absorption refrigerating system, a generator for holding a solution of absorption liquid and refrigerant and effective to vaporize the refrigerant from the solution, an absorber for holding a solution of absorption liquid and newly absorbed refrigerant therein, said generator and said absorber arranged so that one is surrounded by the other whereby there is realized a direct heat transfer between the solution in the absorber and the solution in the generator by a wall dividing said solutions, a heating element for applying heat to the lower portion of said generator, and a baffle in said generator for restricting the circulation of liquid therein so as to cause the formation of steam in the liquid when heated by said heating element.

13. In an absorption refrigerating system, a generator for holding a solution of absorption liquid and refrigerant and effective to vaporize the refrigerant from the solution, an absorber for holding a solution of absorption liquid and newly absorbed refrigerant therein, said generator and said absorber arranged so that one is surrounded by the other whereby there is realized a direct heat transfer from the solution in the absorber to the solution in the generator by a wall dividing said solutions, a heating element for applying heat to the lower portion of said generator, and a series of superposed baffles in said generator serving to restrict the circulation of liquid therein so as to cause the formation of steam in the liquid when heated by said heating element and to impede the upward progress of the steam so that it condenses at gradually decreasing pressures and temperatures.

14. In an absorption refrigeration system, a generator for holding a solution of absorption liquid and refrigerant and effective to vaporize the refrigerant from the solution, an absorber for holding a solution of absorption liquid and newly absorbed refrigerant therein, said generator and said absorber arranged so that one is surrounded by the other whereby there is realized a direct heat transfer between the solution in the absorber and the solution in the generator by a wall dividing said solutions, a heating element for applying heat to the lower portion of said generator, means in said generator for causing stratification of body of liquor therein into strata of different concentrations, and means for restricting circulation of liquid in the lower portion of said generator so as to cause the formation of steam in the liquid when heated by said heating element.

JAMES W. HUFFMAN.